(12) United States Patent
Peters (10) Patent No.: US 7,483,833 B2
(45) Date of Patent: Jan. 27, 2009

(54) INTELLIGENT SPEECH RECOGNITION WITH USER INTERFACES

(75) Inventor: Jochen Peters, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 289 days.

(21) Appl. No.: 10/576,329

(22) PCT Filed: Oct. 13, 2004

(86) PCT No.: PCT/IB2004/052074

§ 371 (c)(1),
(2), (4) Date: Apr. 18, 2006

(87) PCT Pub. No.: WO2005/038777

PCT Pub. Date: Apr. 28, 2005

(65) Prior Publication Data

US 2007/0083366 A1 Apr. 12, 2007

(30) Foreign Application Priority Data

Oct. 21, 2003 (EP) .................................. 03103885

(51) Int. Cl.
*G10L 11/00* (2006.01)
*G10L 15/08* (2006.01)
*G06F 17/27* (2006.01)

(52) U.S. Cl. ............................ 704/270; 704/9; 704/257

(58) Field of Classification Search ................. None
See application file for complete search history.

(56) References Cited

U.S. PATENT DOCUMENTS

| | | | | |
|---|---|---|---|---|
| 5,829,000 A * | 10/1998 | Huang et al. | ................ | 704/252 |
| 6,047,300 A | 4/2000 | Walfish et al. | | |
| 6,064,959 A * | 5/2000 | Young et al. | ................ | 704/251 |
| 6,098,034 A * | 8/2000 | Razin et al. | .................... | 704/9 |
| 6,347,296 B1 * | 2/2002 | Friedland | .................... | 704/231 |
| 6,661,802 B1 * | 12/2003 | Homberg et al. | ............ | 370/412 |
| 7,149,970 B1 * | 12/2006 | Pratley et al. | ............... | 715/257 |
| 7,162,423 B2 * | 1/2007 | Thrasher et al. | ............. | 704/251 |
| 2004/0030540 A1 * | 2/2004 | Ovil et al. | ...................... | 704/1 |

FOREIGN PATENT DOCUMENTS

WO WO 97/49043 12/1997

\* cited by examiner

*Primary Examiner*—David R Hudspeth
*Assistant Examiner*—Brian L Albertalli (57) ABSTRACT

The invention relates to a method, an apparatus, a Graphical User Interface and a computer program product for transforming speech to text. In a speech recognition step (100) a text is provided to which an automatic text modification based on text modification rules is applied (102). Text portions to which the modification applies, are highlighted in the text (106) and at least one suggestion for the modification is displayed to a user (110), being enabled to select one of the suggestions and therefore having control over the automatic text modification process (112). For example the rules identify text portions relating to ambiguous speech or missing text formatting characters that might have been misinterpreted in the speech recognition step.

19 Claims, 5 Drawing Sheets

INTELLIGENT SPEECH RECOGNITION WITH USER INTERFACES

The present invention relates to the field of automatic transformation of speech to text and especially to automatic text modifications of text which has been automatically converted from speech. The automatic text modification detects text portions according to modification rules, generates intelligent modification suggestions and interacts with a user having the final decision for the text modification.

Speech recognition systems that transcribes speech to a written text are known in the prior art. Commercial speech recognition systems are nowadays widely distributed in the medical sector for example in hospitals and also in legal practices. Speech recognition for transcription of spoken speech to written text saves time and reduces costs since a transcription of a dictation has no longer to be performed by a typist.

Typically a dictation not only contains text to be transcribed but also commands that have to be interpreted by the speech recognition system. Punctuation commands should not be literally transcribed as e.g. "colon" or "full stop". Punctuation commands, or formatting or highlighting commands should also be recognized and interpreted by an intelligent transcription system. The recognized text in combination with the interpreted commands finally yields a document which has to be corrected by a human proof reader or editor.

Commercial speech recognition systems such as SpeechMagic™ of Philips Electronics N.V. and the ViaVoice™ system of IBM Corporation feature text recognition as well as command interpretation. Both of these commercial speech recognition systems can be implemented into text processing software products for transcribing, editing, correcting and formatting text. Furthermore, these commercial systems provide voice controlled interaction between a user and a personal computer. Interpreting voice commands activate menu options and other customized software functions as for example browsing the Internet.

Nevertheless a dictation inherently features ambiguous text portions such as e.g. numbers that have to be interpreted as a number or that have to be interpreted literally as a written word depending on the context of the spoken dictation. Such ambiguous text portions are easily misinterpreted by an automatic speech recognition system. Furthermore system-based interpretations of text formatting or text highlighting commands might be erroneous. Such inevitably system-generated misinterpretations have to be manually corrected by a human proofreader which reduces the efficiency of the entire speech recognition system. A system-supported modification or correction of potentially ambiguous or misinterpreted text portions is therefore highly desirable in order to facilitate the proofreading.

Specific text correction and text modification functions for text processing systems are known in the prior art. WO 97/49043 describes a method and a system for verifying accuracy of spelling and grammatical composition of a document. In an electronic document a sentence is extracted and the words of the extracted sentence are checked against misspelling. When the system detects a misspelled word, an indication is displayed in a combined spelling and grammar dialogue box. The word as well as the entire sentence in which the spelling error occurred is displayed. Furthermore a spell checker program module receives suggestions being displayed in a suggestion list box within the combined spelling and grammar dialogue box. A user then inputs a command by selecting one of the command buttons of the combined spelling and grammar dialogue box. In response to the user selecting one of these command buttons the method performs the appropriate steps. In a similar way the method is applicable to grammar checking of sentences.

U.S. Pat. No. 6,047,300 describes a system and method for automatically correcting a misspelled word. In this system a correctly spelled alternate word is generated if a word is detected as a misspelled word. The misspelled word and the correctly spelled alternate word are compared according to a set of different criteria. If the results of various different criteria comparisons satisfy a selection criteria, then the misspelled word is replaced by a correctly spelled alternate word. Even though a word is detected as a misspelled word, the user may have intended that the word appears as entered. To maintain the word as entered, an automatic replacement of the misspelled word must be overridden. In order to override the replacement, the document discloses a spelling embodiment including an exception list of exception words. An exception word has to be defined by the user and is not subject to replacement. The user may edit the exception list to add and to remove exception words.

U.S. Pat. No. 6,047,300 also discloses a spelling embodiment according to which the user may or may not receive notice when a misspelled word is replaced by a correctly spelt word. If the user receives a replacement notice, then the user is aware of the replacement and may confirm or reject the replacement.

The above cited documents only refer to listings of spelling or improper grammatical compositions within electronic text documents. Ambiguous text portions that may arise from a speech to text transcription cannot be identified by the above mentioned methods because the ambiguous text portions are correctly spelt. In the same way text formatting or text highlighting commands included in a dictation and being literally transcribed from an automatic speech recognition system are typically not detectable by means of the above mentioned correction and verifying systems. Generally, these systems are not adaptable for performing a context-based modification of an electronic text.

The present invention aims to provide a method, a system, a graphical user interface and a computer program product for an automatic text modification with user interaction of an electronic text generated by a speech to text recognizing system.

The present invention provides an automatic text modification with user interactions. Preferably reliable modifying actions, such as e.g. the straightforward interpretations of non-ambiguous commands or non-ambiguous text portions are directly executed. When in contrast non-reliable actions, such as e.g. ambiguous text portions or unresolvable commands are detected, the method requests for human expertise prior to the execution of a modifying action. An executed modifying action as well as a request for human expertise is indicated to the user. In this way, the user gains an easy and effective access to modified text portions and/or potentially misinterpreted spoken commands and/or ambiguous text portions as well as other potential problems associated with a speech to text recognition.

For example any kind of number is associated with an ambiguous text portion. Since a number can be interpreted as a number (which has to be written in digits) or as an enumeration or literally as a word, the speech to text recognition system requests for human expertise. A decision whether a number has to be written in digits, as an enumeration, or as a word is context dependent. Such ambiguous text portions are recognized automatically by the system and highlighted in the generated text. In this way the system gives intelligent hints to the proofreader about potential misinterpretations that may have occurred in the speech to text transformation step.

Not only numbers but also certain phrases or words can be subject to misinterpretation. The word "colon" for example may be written as "colon" (e.g. in medical reports) or as ":" as typographical sign depending on the context.

According to a preferred embodiment of the invention, the system features several rules to identify text portions within the recognized text that might be subject to a modification. The generated text is displayed on a user interface for proofreading purposes. In order to facilitate the proofreading, potential text modifications are highlighted within the text. Highlighting can be performed by any means of accentuation as e.g. different colour, different size, different font or different typeface of the text to be modified.

According to a further preferred embodiment of the invention, text portions being matched by at least one of the rules are automatically modified by the system and highlighted in the text. In this way the proofreader can immediately identify those text portions that have been modified by the system. Furthermore the system provides an undo function enabling the proofreader to correct automatically performed modifications of the text.

According to a further preferred embodiment of the invention, the rules provide a confidence value indicating a likelihood whether a matched text portion is subject to modification. A text modification is automatically performed when the confidence value is above a first predefined threshold. In this case the text modification is performed without making any annotation or any further suggestion. When the confidence value is below the first threshold but above a second threshold, the automatic modification is performed associated with an indication for the user and associated with appropriate undo information enabling the user to cancel the performed modification. When the confidence value is below the second threshold, a modification is not performed automatically but a suggestion is indicated to the user and the system requests for a decision to be made by the user whether the matched text portion has to be modified or not. Typically the threshold values for the confidence value can be adapted to the proofreader's or user's preference.

According to a further preferred embodiment of the invention, the text portions matched by the rules are not automatically modified by the system. Instead the proofreader's, or the user's expertise is requested in order to make a decision whether a modification should be performed or not. Text portions matched by the rules are therefore highlighted in the text. The highlighted text portions can then easily be discovered by the proofreader. The highlighted text is typically associated with one or several suggestions for the text modification. Typically the user has a possibility to accept or to reject the suggestions generated by the system. The text modification is finally performed in response to the user's decision.

Depending on the type of text document, different context based rule modules can be applied in order to detect ambiguous or problematic text portions. The context based rule modules are for example specified for a legal practice, or a medical report. Depending on the context, the rules not only detect ambiguous text portions but also refer to some unclear commands contained in the dictation.

Furthermore, commands such as "quote unquote" may be interpreted as a quoting of the next word only or as the beginning of a quoted region of unknown length. In such cases suggestions or hints are generated and highlighted in the text. The single rules may also be specified to detect inconsistencies in documents containing enumeration symbols such as "1, 2, 3, . . . " or "a), b), c), . . . " Since speakers are often not consistent in dictating all enumeration symbols the rules are designed for detecting missing items in a series of enumerations. In this case a hint or a suggestion is generated for the proofreader. Furthermore references to other text sections such as "the same" or "as above" may be transcribed literally or it may be common to resolve these references and to insert the corresponding text. Since any kind of apparatus has normally no chance to resolve such references, the system here provides some hint to the human proofreader if certain reference terms or phrases are detected.

According to a further preferred embodiment of the invention, a suggestion is always generated and the appropriate text portion is always highlighted when two or more conflicting suggestions are provided for a text modification related to a distinct text portion. In such cases where at least two different rules provide different suggestions for a distinct text portion, the human expertise is definitely required. According to the confidence values of each conflicting suggestion the method provides a ranking or a list of suggestions from which the user or proofreader can make a selection.

According to a further preferred embodiment of the invention, an automatic text modification is only performed when the automatic text modification comprises a number of editing operations which is below a predefined threshold value. When the number of text editing operations according to a distinct rule exceeds a distinct threshold value, the appropriate text modification is not performed as long as the proofreader has not made a decision. In this way the method asks for human expertise before it performs a large number of automatic editing operations. Therefore the number of potential undo operations to be performed by the proofreader is reduced to a minimum. Such an interaction with the user saves time and costs.

According to a further preferred embodiment of the invention, the recognized text as well as the generated suggestions according to the different correction rules are outputted to a graphical user interface. The graphical user interface is designed to display the recognized text as well as to display the suggestions for potential text modification operations. A suggestion can be displayed in a manifold of different ways. For example the suggestion can appear in the form of a suggestion menu which is positioned directly next to the highlighted text portion to which the suggestion relates. According to another embodiment of the invention, the different suggestions may appear in a separate window within the graphical user interface.

According to a further preferred embodiment of the invention, a plurality of suggestions for various text portions are only displayed in response to the user's request. Otherwise the graphical user interface may be overcrowded by a plurality of suggestions or suggestion lists. A user's request can be adapted in a manifold of different ways, as e.g. by clicking on a mouse button, shifting a mouse pointer on a highlighted text portion, touching with a finger on the appropriate position on the graphical user interface or simply via entering a universal key shortcut on a keyboard connected to the system.

The appearance of various suggestions for a single highlighted text portion can also be adapted in a manifold of different ways. The single suggestions can appear according to a specified order (e.g. sorted by confidence value) as entries of a menu or as entries of a list, as well as in a completely disordered way. The way of appearance of the suggestions may be further specified by the user.

According to a further preferred embodiment of the invention, a decision requested from the user can be performed in different ways. The user can either select one of the suggestions that have to be performed by the system or the user may manually enter an alternative suggestion to be performed by the system. The selection of a distinct suggestion can for example be realized with the help of a mouse pointer and a mouse click or with a universal keyboard shortcut. Here any other type of interaction between the user and the graphical user interface is possible.

According to a further preferred embodiment of the invention, the selection of a distinct suggestion triggers associated side effects. When the system for example detects a missing enumeration, it suggests to implement this enumeration. When the user in turn decides to insert the missing enumeration, the system automatically gives a hint that a following letter might become subject to capitalization. In this way the execution of some automatic modification according to a first rule invokes a second potential modification according to another rule. The user may further decide about the triggering of such side effects locally or globally in the document.

The triggering of side effects due to a performed modification can further be controlled by means of a previously described confidence value associated with threshold values. In this way a distinction can be made, whether a side effect is automatically performed with or without indication to the user, or whether a side effect is automatically performed without any further interaction with the user.

In the following, preferred embodiments of the invention will be described in greater detail by making reference to the drawings in which.

Figure 1:
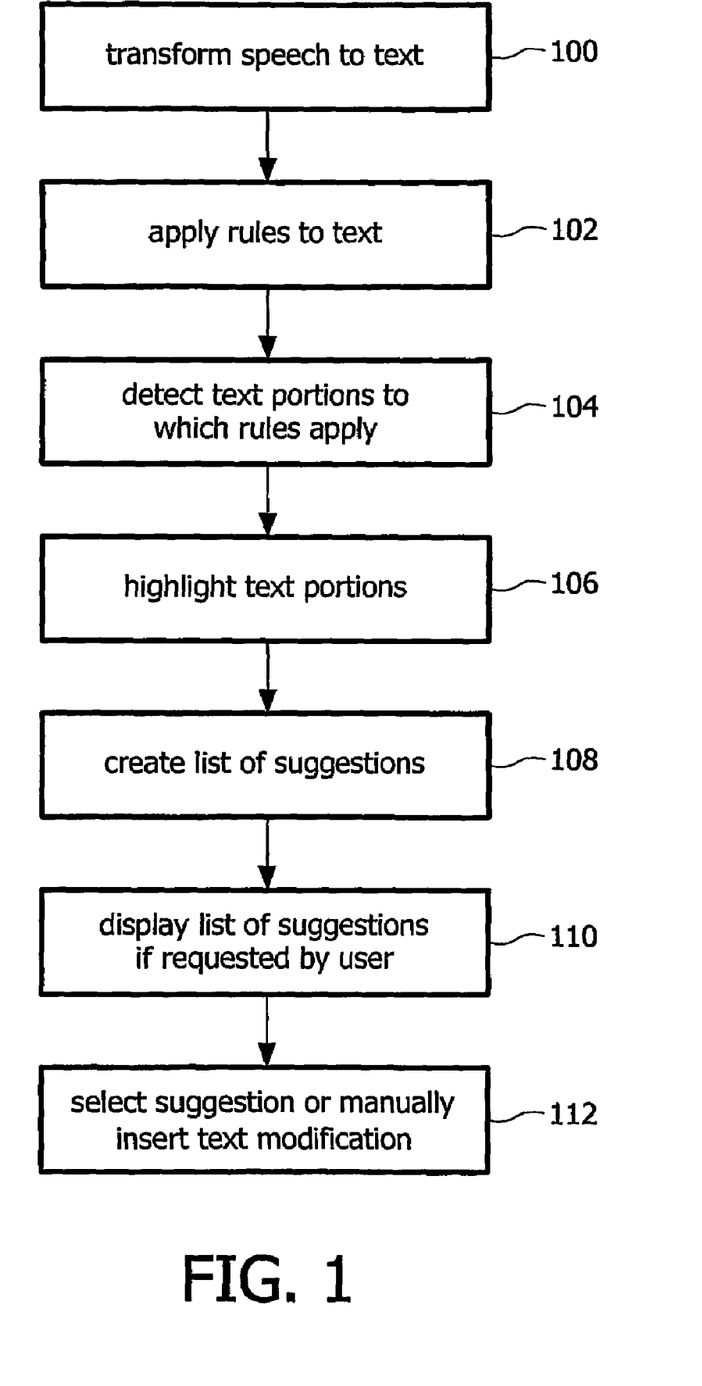
FIG. 1 is illustrative of a flow chart for performing a method of the invention.

FIG. 1 illustrates a flow chart for performing the method according to the invention. In the first step 100 speech is transformed to text. In step 102 it is checked, which text regions are matched by one or several modification or inconsistency rules. In step 104 problematic text regions are detected by means of conflicting applicable modification rules or by a match of some inconsistency rule. In step 106 the identified and detected text portions are highlighted within the text. In step 108 the method creates several suggestions for each highlighted text portion and provides a list of suggestions. In step 110 the created list of suggestions is displayed on the graphical user interface if requested by the user. In step 112 the user selects one of the suggestions or the user manually inserts a text modification which is then inserted in the text.

Figure 2:
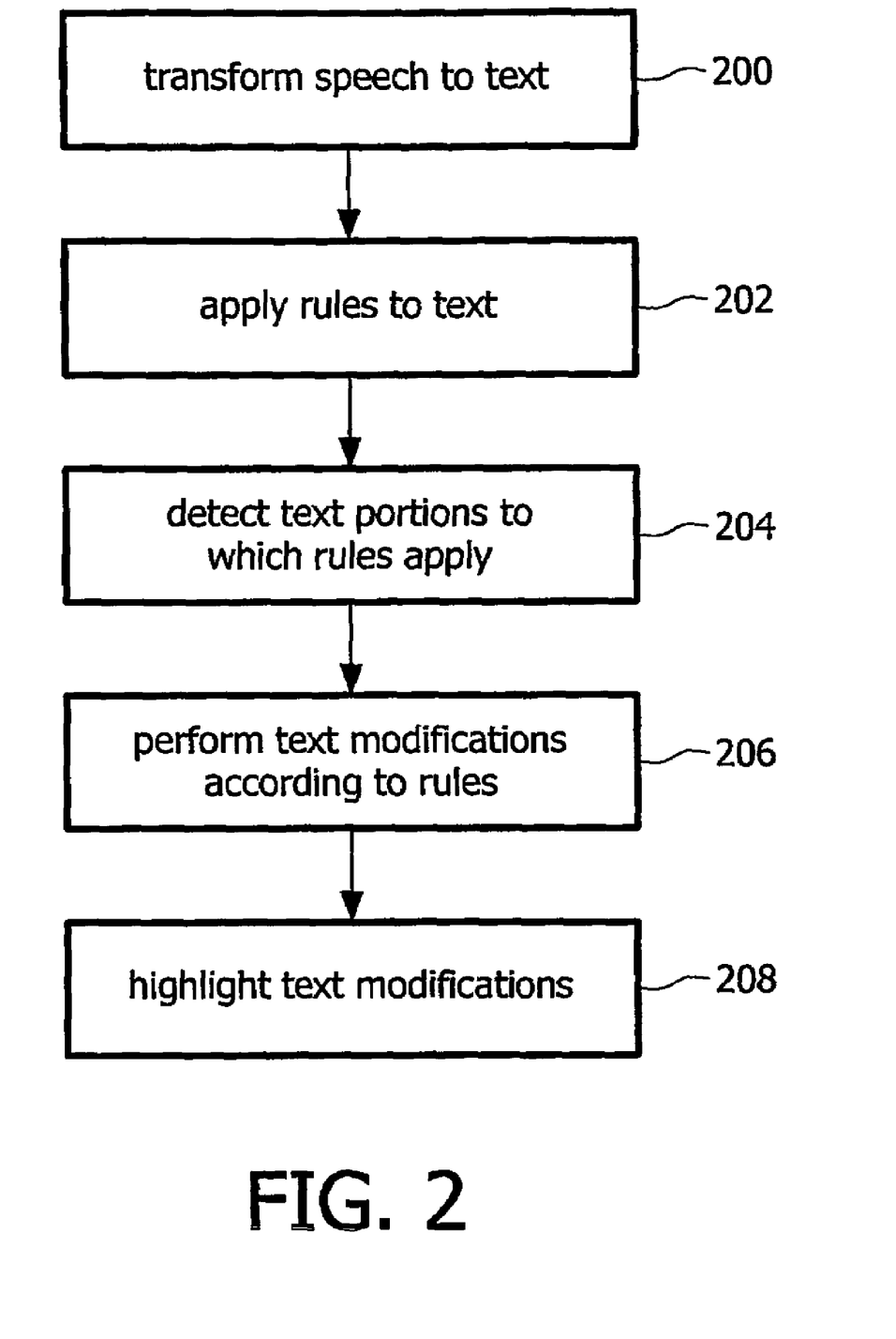
FIG. 2 illustrates a flow chart for performing a second method of the invention.

FIG. 2 illustrates a flow chart of a method of the invention in which automatic text modifications are performed. Similar as described in FIG. 1 in step 200 the speech is transformed to text. In the next step 202 it is checked which regions of the recognized text are matched by one or several modification or inconsistency rules. According to the various rules, text portions potentially being subject to modification are detected by the method in step 204. In step 206 the method automatically performs text modifications according to the rules. Since these automatic text modifications can be erroneous they are highlighted in the text in step 208 and provided with some undo information for the user. In this way the method performs an automatic text modification but also indicates to the user that an automatic, hence potentially erroneous, modification has been performed in the text.

Ideally, the method also provides a specific undo function such that the user can easily revoke text modifications performed by the automatic text modification system.

Figure 3:
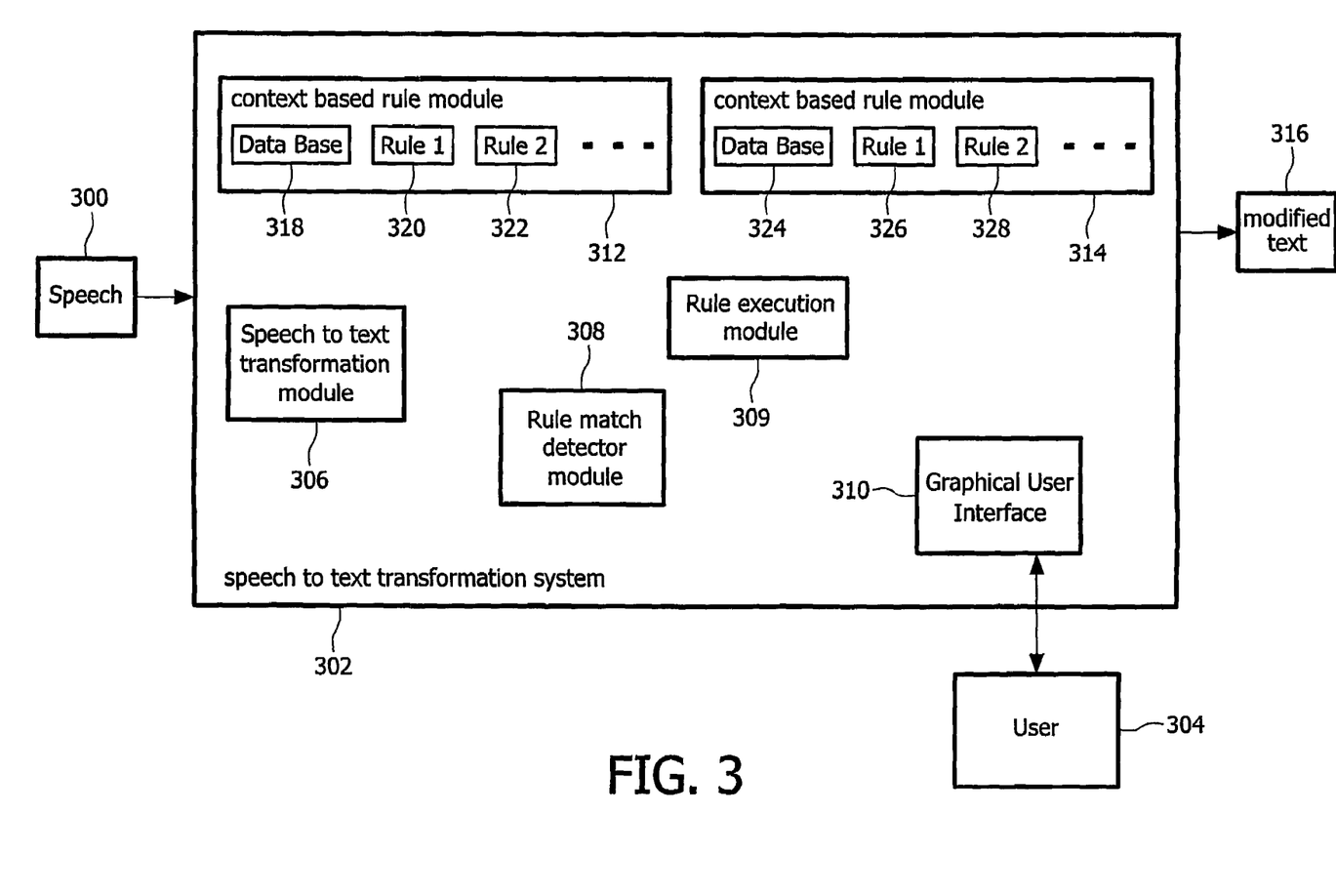
FIG. 3 shows a block diagram of a preferred embodiment of the invention.

FIG. 3 shows a block diagram of a preferred embodiment of the invention based on a speech to text transformation system 302. Natural speech 300 is entered into the speech to text transformation system 302. The speech to text transformation system 302 interacts with a user 304 and generates modified text 316. The speech to text transformation system 302 comprises a speech to text transformation module 306, a rule match detector module 308, a rule execution module 309 as well as a graphical user interface 310. The speech to text transformation system 302 further comprises context based rule modules 312, 314. Each of the context based rule modules 312, 314 comprises a database 318, 324, a first rule 320, 326, a second rule 322, 328 as well as additional rules not further specified here.

Incoming speech 300 is processed in the speech to text transformation module 306 providing a recognized text. The rule match detector module 308 then applies one or several of the context based rule modules 312, 314 to the recognized text. The databases 318, 324 as well as the single rules 320, 322, 326, 328 are specified for a distinct text scope. The databases 318, 324 are for example specified for legal practice or medical reports. In a similar way the rules 320, 322, 326, 328 are specified to different fields of application. Based on the chosen context based rule module 312, 314, the rule match detector module 308 detects text portions within the recognized text that might become subject to modification.

Modifications of the detected text portions are performed by the rule execution module 309. According to the user's preferences, an automatic modification may be directly performed by the rule execution module 309 or may be performed according to a user's decision. Depending on the predefined threshold and confidence values, a performed modification may be indicated to the user associated with undo information or not. A requirement of a user decision is indicated to the user via the graphical user interface 310. The interaction between the speech to text transformation system 302 with the user 304 is handled via the graphical user interface 310. When the system has performed an automatic text modification the appropriate text portion is highlighted on the graphical user interface 310. Text portions whose modification requires a user's decision are also highlighted on the graphical user interface 310. When the system generates suggestions for an automatic modification according to the rules 320, 322, 326, 328, the suggestions are also displayed via the graphical user interface 310. Execution of the user's decisions as well as the automatic text modifications into the recognized text finally give the modified text 316 which is outputted from the speech to text transformation system 302. Furthermore, when a text portion matches an inconsistency rule, applying to e.g. a missing enumeration, an unresolvable reference or other inconsistencies, a warn icon indicating a text inconsistency is generated on the graphical user interface 310.

Figure 4:
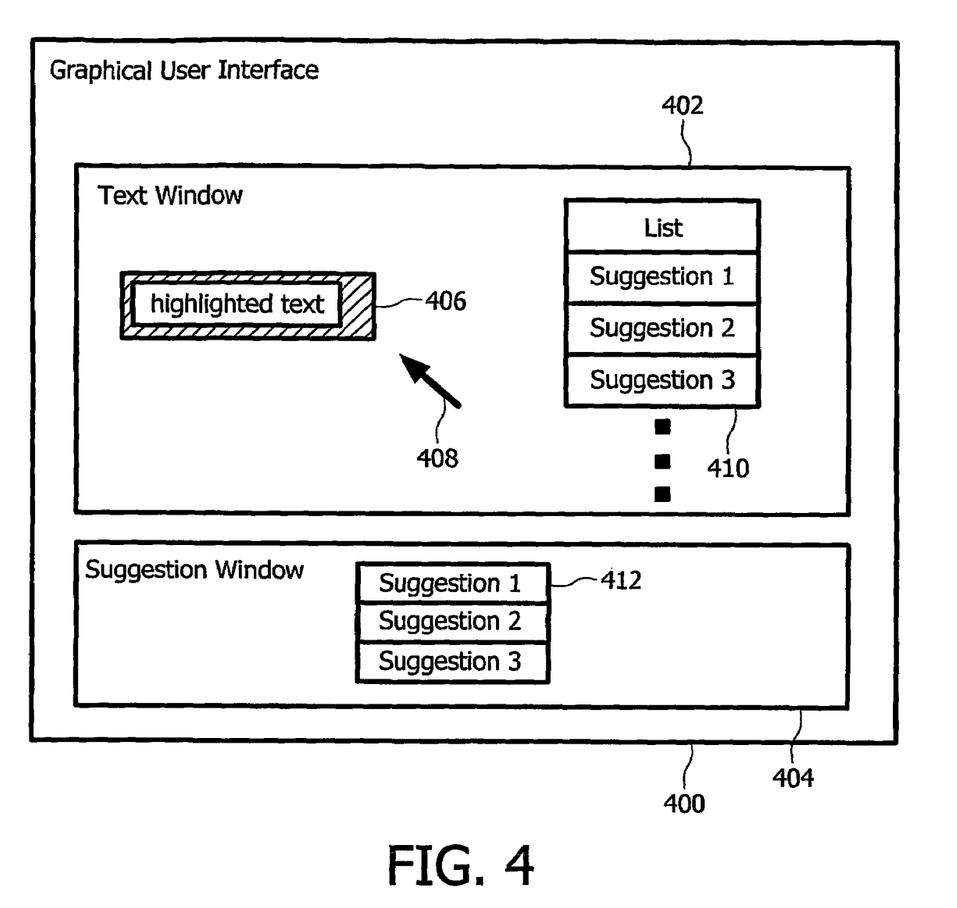
FIG. 4 shows a block diagram of a graphical user interface.

FIG. 4 shows a block diagram of a graphical user interface 400 of the present invention. The graphical user interface 400 comprises a text window 402 as well as a suggestion window 404. The text window 402 typically contains several highlighted text portions 406 indicating a potential modification or a warn icon of a text inconsistency. The highlighting of the text can be performed in different ways, such as e.g. different color, different font or other preferably visual indications. Various suggestions for the modification of a highlighted text portion can be displayed by means of a suggestion list 410 appearing within the text window 402 or within the suggestion window 404. The suggestion window 404 as well as any list of suggestions 410, 412 may be always present inside the graphical user interface 400 but may also only appear on a user's demand.

With the help of a mouse pointer 408, the user can select certain highlighted text portions 406 for which the appropriate suggestion list 410, 412 or the suggestion window 404 appears. The selection of highlighted text portions 406 for which lists of suggestions 410, 412 appear can also be performed with the help of any other type of input means, such as e.g. a keyboard shortcut, a touch screen or even a speech command of the user. With the help of the same means, the user finally selects one of the provided suggestions of the suggestions lists 410, 412 or the user may manually enter an alternative text portion.

Figure 5:
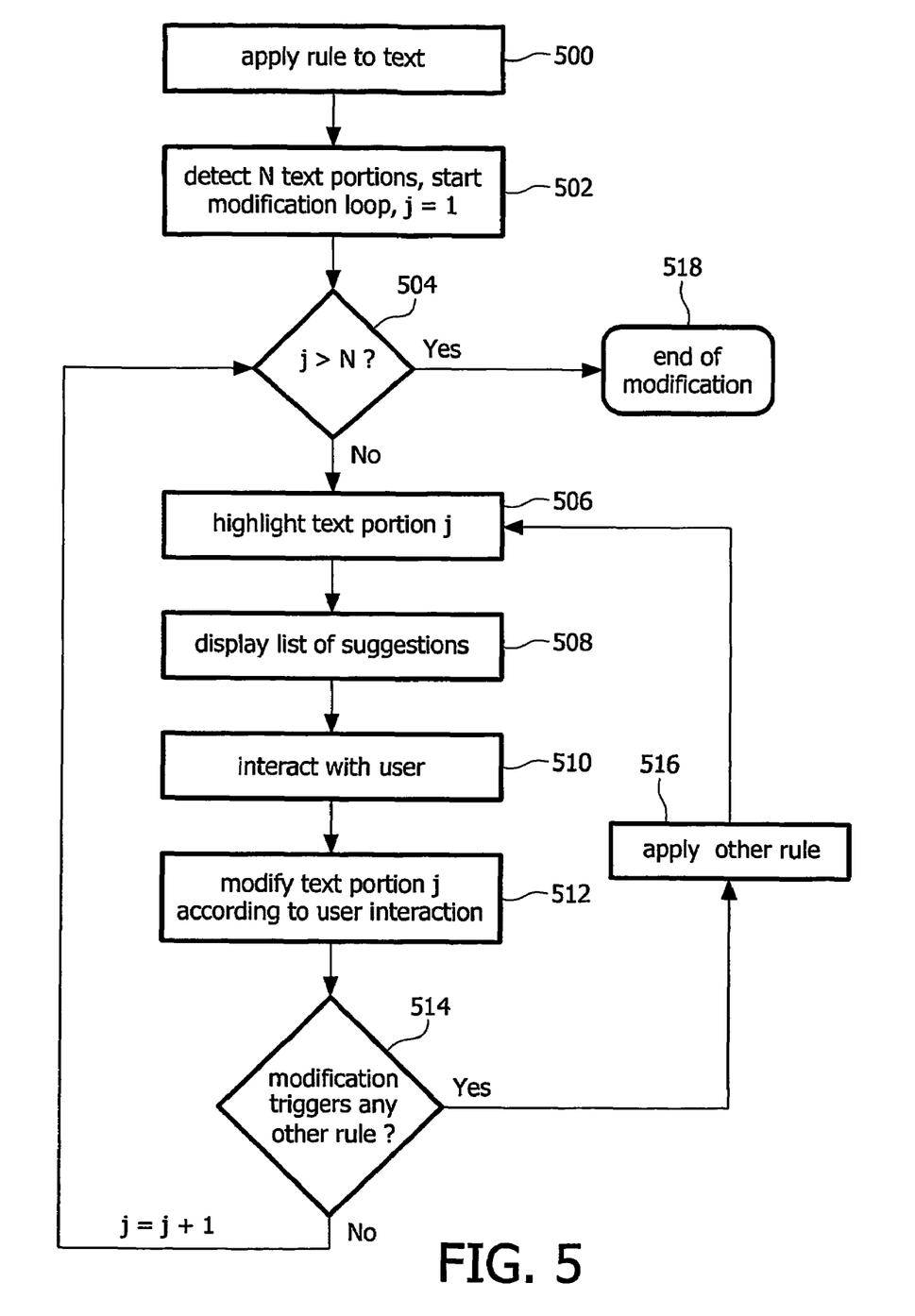
FIG. 5 is illustrative of a flow chart for triggering a modification rule.

FIG. 5 is illustrative of a flow chart representing the execution of text modifications with respect to triggering of rules as side effects of performed text modifications. In a first step 500 it is checked which text portions of the recognized text are matched by one or several modification or inconsistency rules. In step 502, N text portions potentially being subject to an automatic text modification are detected and an index j is initiated (j=1). Step 504 compares the index j and the number N of text portions being potentially subject to modification. If j is larger than N, the method proceeds with step 518 and the modification ends. If in step 504 j is less or equal than N, then in step 506 the first text portion (j=1) is highlighted within the recognized text. In step 508 the method provides a list of suggestions for the text modification which is displayed on the graphical user interface. In step 510 the interaction with the user is performed. Next the text portion j is modified according to the user interaction in step 512.

The following step 514 checks whether the performed modification of the text triggers any other of the text modification rules. For example when the first modification enters a missing punctuation such as a ".", the proceeding word of the next sentence has to be capitalized according to an other rule. When in step 514 the performed modification triggers such an other rule, the other rule is applied to the text portion in step 516. After the other rule has been applied to the designated text portion, the method returns to step 506 and performs the same suggestion and interaction procedure for the selected rule. When in contrast in step 514 no other rule is triggered by the performed modification, the index j is increased by 1 and the method returns to step 504.

LIST OF REFERENCE NUMERALS

300 speech
302 speech to text transformation system
304 user
306 speech to text transformation module
308 rule match detector module
309 rule execution module
310 Graphical User Interface
312 context based rule module
314 context based rule module
316 modified text
318 data base
320 rule
322 rule
324 data base
326 rule
328 rule
400 Graphical User Interface
402 text window
404 suggestion window
406 highlighted text
408 mouse pointer
410 list of suggestions
412 list of suggestions

The invention claimed is:

1. A method for speech to text transformation comprising the steps of:
performing a speech recognition step to provide a text,
applying at least one rule to the text for performing at least one automatic text modification,
outputting the text on a user interface,
outputting at least one suggestion for the automatic text modification on the user interface, and
wherein the text modification comprises a number of editing operations, a suggestion for the text modification being outputted when the number of editing operations exceeds a predefined threshold value.

2. The method according to claim 1, wherein the at least one text modification is performed automatically and is highlighted in the text for a user's review.

3. The method according to claim 1, wherein a portion of the text to which the at least one suggestion relates is highlighted in the text, and the at least one text modification is performed in response to a user's acceptance of the suggestion.

4. The method according to claim 1, the at least one rule providing a confidence value for the at least one modification, wherein the suggestion is only outputted for a user's review when the confidence value is below a threshold.

5. The method according to claim 1, wherein suggestions are outputted for a user's selection when at least first and second conflicting suggestions for the text modification are provided.

6. The method according to claim 1, wherein the text and the suggestions are outputted to a graphical user interface.

7. The method according to claim 1, wherein the at least one suggestion is displayed when the user enters a suggestion command.

8. The method according to claim 2, wherein the user's review comprises selecting one of the suggestions by entering a selection command or manually entering a text modification.

9. The method according to claim 1, wherein a first automatic text modification is performed according to at least one suggestion provided by a first rule, and further comprising applying of at least a second rule to the first text modification and outputting of at least a second suggestion for a second automatic text modification.

10. A speech to text transformation system comprising:
means for performing a speech recognition step to provide a text,
means for applying at least one rule to the text for performing at least one automatic text modification,
means for outputting the text on a user interface and outputting at least one suggestion for the automatic text modification, and
wherein the text modification comprises a number of editing operations, a suggestion for the text modification being outputted when the number of editing operations exceeds a predefined threshold value.

11. The system according to claim 10, comprising means for highlighting a text modification or a text portion to which relates at least one suggestion for a user's review.

12. The system according to claim 10, comprising means for generating at least one suggestion output when at least first and second conflicting suggestions for the text modification are provided or when the text modification comprises a number of editing operations, the number exceeding a predefined threshold value.

13. The system according to claim 10, comprising means for displaying the at least one suggestion on a graphical user interface when the user enters a suggestion command.

14. The system according to any one of the claims 10 to 13, comprising means for performing a first automatic text modification in accordance with a first suggestion provided by a first rule, and further comprising means for applying of at least a second rule to the first text modification and outputting of at least a second suggestion for a second automatic text modification.

15. A graphical user interface for a speech to text transformation system having at least one rule for performing at least one automatic text modification and having at least one suggestion for the automatic text modification, the graphical user interface comprising:
   means for generating a display of the text,
   means for highlighting text and highlighting text portions to which the at least one suggestion relates,
   means for displaying the at least one suggestion for the automatic text modification, and
   wherein the text modification comprises a number of editing operations, a suggestion for the text modification being outputted when the number of editing operations exceeds a predefined threshold value.

16. The graphical user interface according to claim 15, further comprising means for entering a suggestion command by the user in order to initiate the display of the at least one suggestion.

17. A computer program product for a speech to text transformation system comprising program means for:
   performing a speech recognition step to provide a text,
   applying at least one rule to the text for performing at least one automatic text modification,
   outputting the text on a user interface,
   outputting at least one suggestion for the automatic text modification for a user's review, and
   wherein the text modification comprises a number of editing operations, a suggestion for the text modification being outputted when the number of editing operations exceeds a redefined threshold value.

18. The computer program product according to claim 17, the program means being adapted to perform the steps of:
   outputting suggestions for a user's selection when at least first and second conflicting suggestions for the text modification are provided,
   outputting a suggestion for a user's selection when the text modification comprises a number of editing operations exceeding a predefined threshold number.

19. The computer program product according to claim 17, the program means being adapted to perform a first automatic text modification in accordance with a first suggestion provided by a first rule, and further comprising applying of at least a second rule to the first text modification and outputting of at least a second suggestion for a second automatic text modification.

* * * * *